Aug. 10, 1965     W. A. BARTEL ETAL     3,199,236
FARM TRACTOR BULLDOZER

Filed Dec. 7, 1962     3 Sheets-Sheet 1

INVENTORS
WALTER A. BARTEL
DONALD L. MARTENS
BY
Head & Johnson
ATTORNEYS

Aug. 10, 1965  W. A. BARTEL ETAL  3,199,236
FARM TRACTOR BULLDOZER

Filed Dec. 7, 1962  3 Sheets-Sheet 2

INVENTORS
WALTER A. BARTEL
DONALD L MARTENS
BY
Head & Johnson
ATTORNEYS

Aug. 10, 1965   W. A. BARTEL ETAL   3,199,236
FARM TRACTOR BULLDOZER
Filed Dec. 7, 1962   3 Sheets-Sheet 3

INVENTORS
WALTER A. BARTEL
DONALD L. MARTENS
BY
Head & Johnson
ATTORNEYS

United States Patent Office 3,199,236
Patented Aug. 10, 1965

3,199,236
FARM TRACTOR BULLDOZER
Walter A. Bartel and Donald L. Martens, Fairview, Okla., assignors to Waldon Inc., a corporation of Oklahoma
Filed Dec. 7, 1962, Ser. No. 243,059
4 Claims. (Cl. 37—144)

This invention relates to an improved farm tractor bulldozer. More specifically, this invention relates to an improved apparatus for converting a farm tractor into a bulldozer.

Farm tractor bulldozer assemblies are in common use today, but these known assemblies are usually extremely heavy and difficult to assemble, commonly requiring the assistance of several persons using jacks or lifting bars. Also, these known farm tractor bulldozer assemblies require a complicated linkage assembly for raising and lowering the dozer blade, which complicates the assembly operation and results in a multiplicity of wear points that are subject to frequent operational failure.

Therefore, it is an object of this invention to provide a farm tractor bulldozer that overcomes the disadvantages of prior art farm tractor bulldozer assemblies.

Another object of this invention is to provide an easily assembled apparatus for converting a farm tractor into a bulldozer.

A still further object of this invention is to provide an apparatus for converting a farm tractor into a bulldozer wherein the apparatus has a minimum of wearing points.

Another object of this invention is to provide an apparatus for converting a farm tractor into a bulldozer wherein the push assembly is applied to the blade assembly at the same point where the dozer blade is hinged for raising and lowering in order to reduce to a minimum the number of linkages and wear points in the apparatus.

An additional object of this invention is to provide an apparatus for converting a farm tractor into a bulldozer wherein a push assembly is connected to the chassis at the middle portion of the tractor and to the rearward draw bar assembly of the tractor which not only assists in the attachment of the apparatus to the tractor but also prevents the concentration of pushing stress at any one point in the farm tractor-bulldozer assembly.

A further object of this invention is to provide an improved farm tractor bulldozer apparatus that is easily assembled to the tractor without the aid of auxiliary jacks or lifting bars.

Still another object of this invention is to provide an apparatus for converting a farm tractor into a bulldozer wherein the apparatus is provided with one or more hydraulic cylinders which furnish the power for lifting and lowering the dozer blade of the apparatus and for connecting the apparatus to the farm tractor.

Still a further object of this invention is to provide an apparatus for converting a farm tractor into a bulldozer which requires a minimum of bracing.

A still further object of this invention is to provide a farm tractor bulldozer apparatus wherein the dozer blade frame will not twist or spring back when subjected to heavy loads.

Another object of this invention is to provide an improved farm tractor bulldozer assembly wherein the height to which the dozer blade may be raised is adjustable.

Further objects and advantages of this invention will be apparent from the following description and appended claims, reference being had to the accompanying drawings forming a part of this specification wherein like reference characters designate corresponding parts in the several views.

GENERAL DESCRIPTION

In general the farm tractor bulldozer apparatus of this invention consists of a bulldozer blade, blade frame, and a bulldozer pushing frame that are easily mounted upon a conventional farm tractor chassis and connected thereto at a multiplicity of points. The blade frame is pivotally connected to the pushing frame. A power source connecting with the blade frame and the push frame is operable to cause the pivotal movement, which is used to raise and manipulate the apparatus for connection to the tractor and thereafter used to raise and lower the blade.

Detailed description

Figure 2:
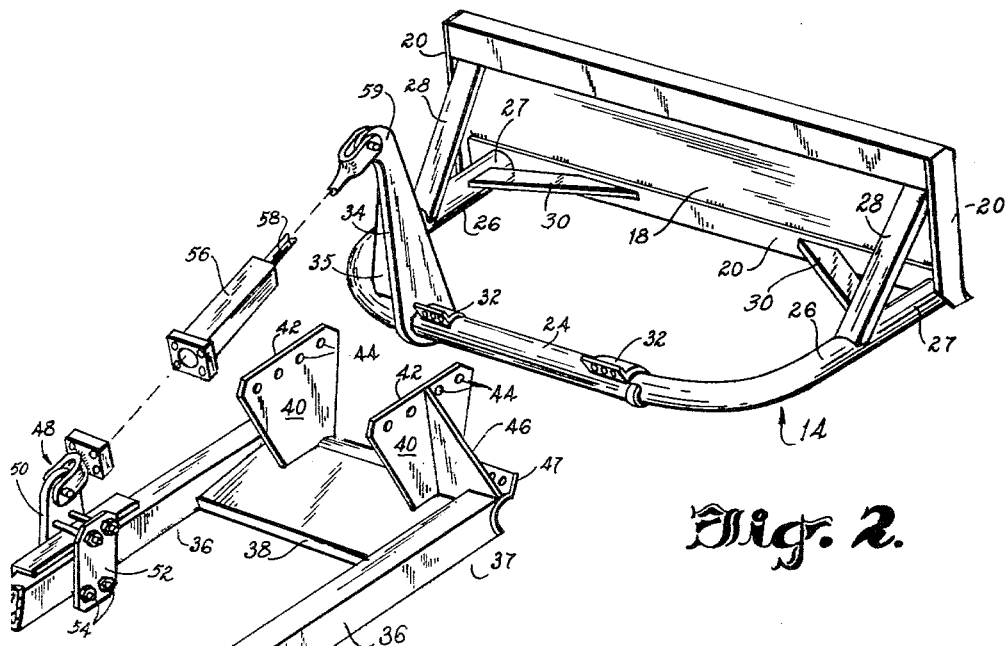
FIGURE 2 is an exploded isometric view of the bulldozer blade, blade frame, and blade pushing frame of the farm tractor bulldozer of this invention.
Figure 1:
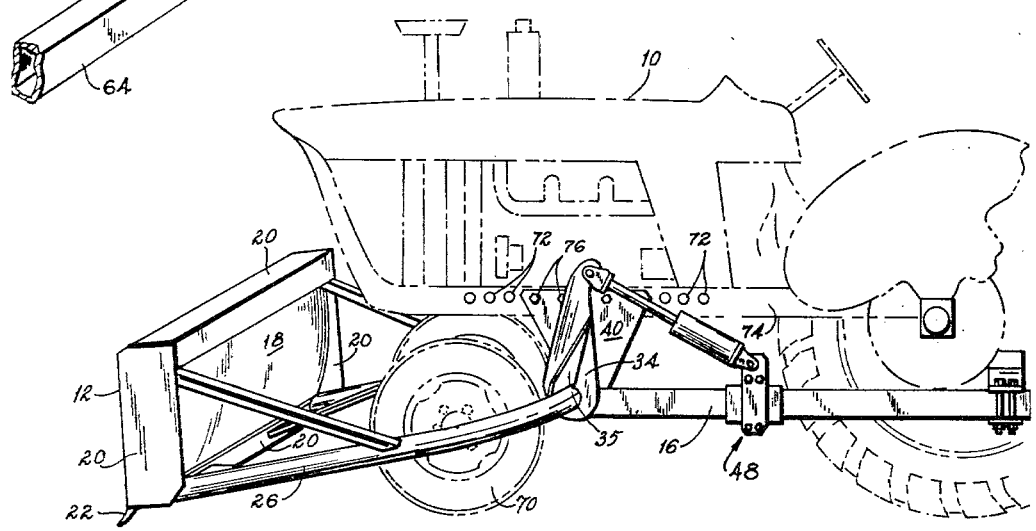
FIGURE 1 is a side elevational view of the farm tractor bulldozer assembly of this invention assembled in operative position.

For a more specific description of the farm tractor bulldozer of this invention, reference is now made to the figures and particularly to FIGURES 1 and 2. In FIGURE 1 there is shown a conventional farm tractor 10 to which is connected a dozer blade 12, a dozer blade frame 14 and a pushing frame 16.

The dozer blade 12 may be of any conventional design and is represented here as a forwardly facing concave section 18 backed up at its peripheral edges by angle iron sections 20 and having a conventional bottom cutting or scraping edge 22, which may be a reversible or replaceable type. In one embodiment the blade 12 can be pivotally attached to the pushing frame.

The blade frame 14 preferably consists of a U-shaped tubular section having a bight portion 24 and leg portions 26. The ends 27 of legs 26 are connected to the bottom portion of the dozer blade 12 by any conventional means, such as welding.

Angle bracing members 28 extend upwardly from the intermediate portion of legs 26 and are connected to the upper portion of the dozer blade 12. Additional angle bracing members 30 extend inwardly from the leg portions 26 and are connected to the bottom portion of blade 12. These four bracing members include all the bracing that is required for this simply constructed dozer blade-blade frame assembly.

Rotatably positioned about the bight portion 24 of blade frame 14 are two brackets 32. Rigidly affixed to bight portion 24 near the outside edge of one of the brackets 32, is an upwardly extending elevator arm 34 for the purpose and functioning of which will be more fully described hereinafter. A gussett plate 35 is connected, as by welding, into the outside angle of connection between the elevator arm 34 and the blade frame 14 to provide reinforcing for arm 34.

Pushing frame 16 consists of two parallel tubular arms 36 of steel, shown here as a conduit of substantially square shaped cross-section, rigidly connected together at their forward ends 37 by a forwardly and upwardly inclined metallic plate 38. Parallel vertical plates 40 are rigidly connected to plate 38 at points spaced slightly inwardy from arms 36. The spacing between plates 40 will, of course, usually depend upon the width of the tractor chassis to which it will be attached. Extending along the upper edge 42 of each plate 40 is at least one horizontal row of spaced perforations 44. Extension plates, not shown, can be readily adapted to or as a part of plates 40 for particular dimensional changes in tractor models or styles. Metallic gusset plates 46 are located in the outside angle of connection of vertical plates 40 to plate 38 and are connected to plates 40, plate 38, and sections 36 for providing reinforcing bracing for plates 40.

Connected to the forward end 37 of each arm 36 is a bearing or bushing bracket 47 for connection to matching brackets 32 on dozer blade frame 14 as by bolts or similar connecting means, not shown.

Movably located on the length of one of the arms 36 of pushing frame 16 is a bracket assembly 48 consisting of two vertical parallel plate members 50 and 52, interconnected by bolts 54. Outermost plate member 50 extends vertically a sufficient distance to accommodate pivotal attachment thereto of the cylinder portion of a conventional hydraulic piston-cylinder apparatus 56. The piston rod 58 of hydraulic apparatus 56 extends upwardly and is pivotally attached to the upper end 59 of elevator arm 34. Hydraulic apparatus 56 can be operated by conventional hydraulic pump, not shown, driven by a power take-off on the farm tractor 10.

It should be noted that by simply moving bracket assembly 48 rearwardly or forwardly on arm 36 of pushing frame 16, the height to which dozer blade 12 can be elevated by hydraulic apparatus 56 can be increased or decreased, respectively.

After the pushing frame 16 has been connected to the tractor 10 in a manner to be described hereinafter, hydraulic apparatus 56 will be used as the sole means for raising and lower dozer blade 12. It must be noted that hydraulic apparatus 56 is also used as the sole means for elevating the blade frame 14 and pushing frame 16 into locking position on tractor 10.

Figure 3:
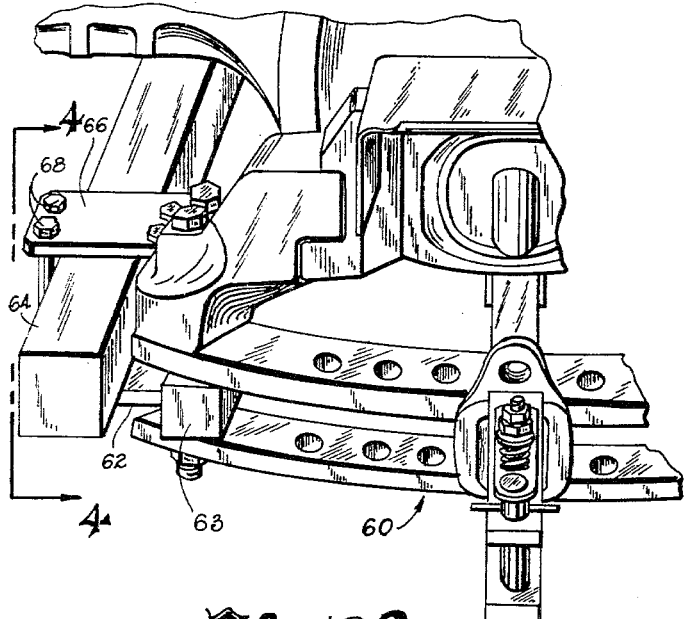
FIGURE 3 is an elevational view of a portion of the drawbar assembly of a farm tractor showing the method of attaching the rearward portion of the bulldozer push frame to the tractor.
Figure 4:
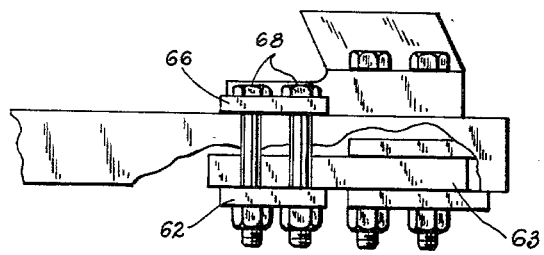
FIGURE 4 is a side elevational view taken along line 4—4 of FIGURE 3.

Referring now to FIGURE 3, there is shown the tractor drawbar assembly, indicated generally as 60. Rigidly attached to drawbar assembly 60 is a horizontal plate or bar 62 extending transverse to the longitudinal axis of the tractor 10, outward of the ends of the drawbar assembly. Preferably the bar 62 is welded to drawbar spacer 63. When pushing frame 16 is operably connected to tractor 10 the rearward end portion 64 of arms 36 will rest upon the outward end portions of bar 62 and will be clamped thereto by means of upper plate 66 that is attached to bar 62 by vertical bolts 68. It must be understood that the just described method of attaching rearward end portions 64 of arms 36 to the tractor 10 is by way of example only, it being intended that other methods and means of so attaching these respective elements can be utilized without departing from the spirit and scope of this invention. Likewise, portions 64 can be attached to some other rearward portion of tractor 10 such as, for example, the rear axle housing.

*Operation*

Figure 5:
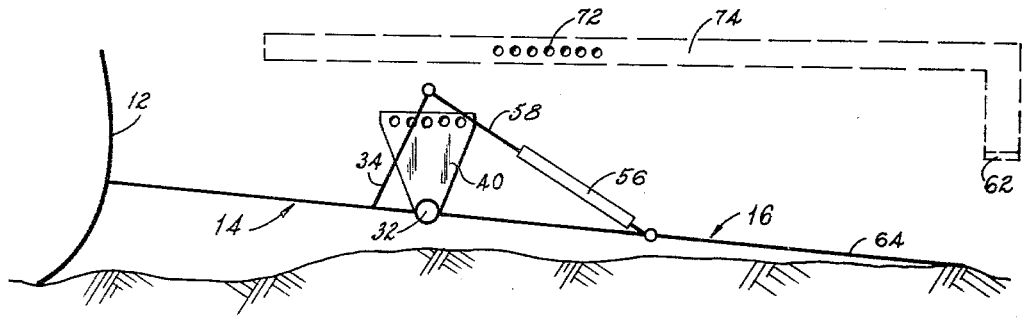
FIGURES 5, 6 and 7 are diagrammatic views of the views of the operation and assembly of the apparatus of this invention.
Figure 6:
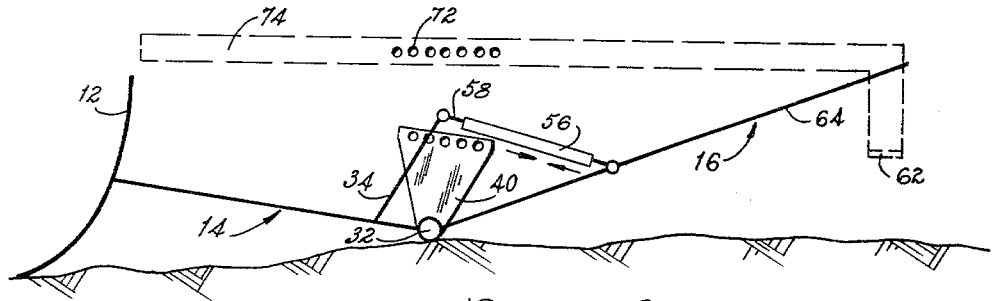
Figure 7:
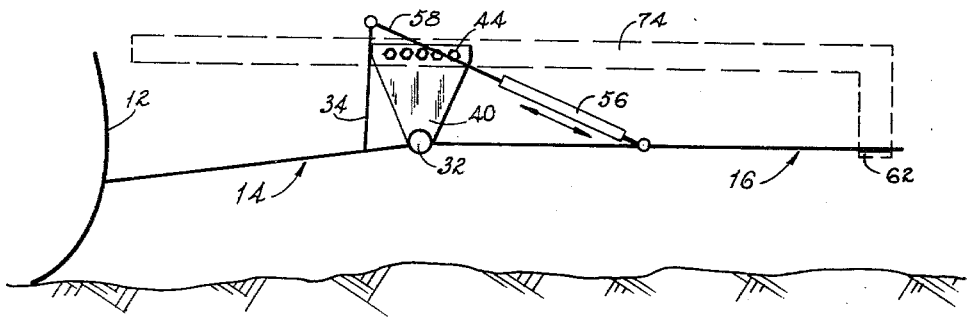

The operational attachment of the bulldozer apparatus of this invention to a tractor can be best understood with reference to the drawings, especially FIGURES 5, 6 and 7. Blade frame 14 and pushing frame 16 are pivotally connected together on the ground by connecting brackets 32 and 47, located on their respective parts. The front wheels 70 of tractor 10 are then positioned within the area enclosed by blade frame 14 with the rear wheels 71 located one on each side of arms 36 of pushing frame 16. Ordinarily, upwardly extending elevator arm 34 will not allow front wheels 70 to be advanced parallel to pushing frame 16, into position, therefore, the following procedure is followed.

Tractor 10 is located on the same side of pushing frame 16 as is elevator arm 34. In this instance, the elevator arm 34 is on the left side of pushing frame 16 and blade frame 14. Tractor 10 is then advanced at an angle to pushing frame 16 until the left front wheel 70 is located between arms 36 and the right front wheel is located on the right hand side of pushing frame 16. Front wheels 70 are then cut sharply to the left and advance of the tractor continued thereby bringing tractor 10 into parallel relation to pushing frame 16 with the left front wheel 70 still positioned between arms 36, the right front wheel 70 positioned on the right side of pushing frame 16, and the rear wheels positioned one on each side of pushing frame 16. Tractor 10 is then advanced parallel to pushing frame 16 until the left front wheel 70 advances up inclined plate 38 and both front wheels pass over the bight portion 24 of blade frame 14 to become located within the area enclosed by this blade frame. Tractor 10 is then manipulated to bring it into parallel alignment with respect to the push frame 16. In the event that the distance between the two front wheels 70 is less than the distance between the two vertical plates 42, tractor 10 can simply be advanced forwardly parallel to frame 16 to position front wheels 70 within the area enclosed by blade frame 14 preparatory to attaching the apparatus to the tractor.

Hydraulic apparatus 56 is then pivotally connected between bracket 48 on pushing frame arm 36 and the upper end 59 of elevator arm 34. Appropriate power fluid connections, not shown, are then extended from tractor 10 to the hydraulic apparatus 56.

The piston rod 58 is then hydraulically retracted into the hydraulic cylinder, thereby shortening the effective length of the hydraulic apparatus 56. Because of the shortening of the length of hydraulic apparatus 56, pushing frame 16 and blade frame 14 would normally tend to rotate upwardly and oppositely about their point of pivotal connection. However, due to the over-balancing weight at the relatively heavy dozer blade 12 and blade frame 14, the rearward portions 64 of pushing frame arms 36 will be elevated while blade and blade frame 14 remain in contact with the ground.

With the rearward portions 64 of pushing frame arms 36 in this rearwardly inclined position, the tractor 10 is advanced a short distance forward to position rearward portions 64 above transverse bar 62 on the tractor drawbar assembly 60.

The piston rod 58 of hydraulic apparatus 56 is then extended outwardly, thereby increasing the effective length of hydraulic apparatus 56. This tends to cause opposite rotation of the rearward portions 64 of pushing frame arms 36 and the dozer blade 12, respectively, downwardly about their point of connection. However, a downward rotation of these respective parts is prevented by the transverse bar 62 and the ground, respectively. Therefore, blade frame 14 and pushing frame 16 will tend to rise at their point of connection. The result will be that vertical plates 40 will be elevated to a point that perforations 44 therein register with matching perforations 72 in the tractor chassis 74. Plates 40 are then rigidly connected to tractor frame 74 as by bolts 76 or similar connecting means, not shown. Top plates 66 are then positioned on top of arms 36 of pushing frame 16 and are bolted to transverse bar 62 to clamp the rearward portion 64 of arms 36 to the drawbar assembly 60 of the tractor. The assembly operation of the farm tractor bulldozer is then completed and the farm tractor bulldozer is ready for use.

Should it happen that when plates 40 are elevated the perforations 44 on these plates do not exactly register with perforations 72 on tractor frame 74, the tractor 10 may simply be driven forwardly or rearwardly a short distance sufficient to bring these respective perforations into registering position such that bolts 76 can be passed therethrough.

It should be clear to one skilled in the art that dozer blade 12 is raised or lowered by simply retracting or extending the length of hydraulic apparatus 56.

An alternate method for assembling the farm tractor bulldozer of this invention includes the preliminary steps as set out above for the preferred method of assembly, up to the point at which the rearward portions 64 of arms 36 are elevated by operation of hydraulic apparatus 56. In this alternate method, while the interconnected blade frame 14 and pushing frame 16 are pivotally connected together on the ground, the length of the hydraulic apparatus 56 is extended thereby causing the point of connection between the frames 14 and 16 to rise. When plates 40 have been elevated such that at least one of the perforations 44 of each plate registers with a matching perforation 77 of tractor chassis 72, the plates are connected to the chassis in the manner already described. At this time, hydraulic apparatus 56 is shortened, thereby elevating the rearward portions 64 of arms 36 which then are attached to the tractor drawbar assembly 60.

It should be evident to one skilled in the art that when applying this alternate method of assembling the farm tractor bulldozer of this invention, the transverse bar 62 must be removed from the drawbar assembly 60 of the tractor 10 prior to elevating rearward portions 64 of arms 36. After the rearward portions 64 have been elevated into the desired position, bar 62 is then positioned upon and connected to the drawbar assembly 60 in a position substantially as described above in the preferred method for assembling the apparatus. The portions 64 are then connected to bar 62 in a manner already described. Thereafter, the farm tractor bulldozer is assembled and ready for operation.

It must be pointed out that the fact that the blade frame 14 is a U-shaped continuous piece of tubular metal stock allows the dozer blade 12 to be hingedly connected to pushing frame 16 and requires a minimum of bracing. Also, because blade frame 14 is one continuous piece and curved in the manner shown and described, it should be evident that twist or spring-back in frame 14 is reduced to a minimum or prevented entirely.

It should likewise be evident to one skilled in the art that by attaching the pushing frame 16 to both the center and rear of tractor 10 at a multiplicity of points, the frame is effectively connected into a solid unit thereby preventing any concentration of excess pressure or stress at any particular point or place on the tractor 10 or frame 16 which could cause serious damage.

The utilization of the blade raising and lowering apparatus (the hydralic apparatus 56) to assist in elevating blade frame 14 and pushing frame 16 for connection to tractor chassis 74 enables one person alone to easily assemble this farm tractor bulldozer apparatus with a minimum of effort. It also allows reduction of linkages and wear points to a minimum thereby reducing the possibility of failure in the apparatus.

Likewise, the use of the adjustable bracket 48 for connection of the hydraulic apparatus 56 to the pushing frame 16 allows for varying the heights to which the dozer blade 12 can be elevated.

In general, the farm tractor bulldozer apparatus of this invention is a relatively strong, greatly simplified apparatus that is easily assembled by one person alone without the assistance of jacks or lifting bars.

The blade frame, if desired, is easily removed from the pushing frame when desired by disconnecting the hydraulic cylinder from the elevator arm and the brackets 32. The tractor is then reversed slightly permitting the blade frame to drop out of place. The pushing frame remains affixed to the tractor for later connection.

The invention has been described by reference to specific and preferred embodiments. It will be apparent, however, that many modifications can be made without departing from the spirit and scope of the invention. Accordingly, this invention should be construed not to be limited to the embodiment herein described but should be limited only by the scope of the appended claims.

What is claimed:

1. Apparatus for converting a farm tractor chassis into a bulldozer, said apparatus consisting of:
 a pushing frame consisting of two longitudinal arms having a forward end and a rearward end, said arms to extend substantially parallel to the forward-rearward axis of said chassis; a forwardly and upwardly inclined transverse plate extending between the forward ends of said arms and rigidly connected thereto; at least two relatively flat plates attached one each to said transverse plate and spaced slightly inwardly from said arms, said plates extending upwardly for attachment to said chassis;
 means for attaching the rearward ends of said arms to said tractor chassis;
 a bulldozer blade frame consisting of a substantially U-shaped member having a bight portion and two leg portions, said bight portion being pivotally connected to said forward ends of said arms of said pushing frame, said leg portions to extend outwardly and forwardly of the front wheels of said tractor;
 an upwardly extending elevator arm rigidly attached to said bight portion of said bulldozer frame;
 a bulldozer blade rigidly attached to said leg portions of said blade frame, at the forwardmost ends thereof;
 hydraulic means between said pushing frame and said elevator arm to pivot said bulldozer blade frame vertically about the point of connection of said bulldozer blade frame to said arms of said pushing frame.

2. Apparatus for converting a farm tractor chassis into a bulldozer according to claim 1, wherein said hydraulic means to pivot said bulldozer blade and said bulldozer blade frame consists of an expansible and retractable hydraulic piston-cylinder arrangement pivotally attached at one end to the uppermost end of said elevator arm and pivotally attached at the other end to one of said arms, the point of attachment to said arm being longitudinally variable.

3. In combination,
 a farm tractor having a chassis, two front wheels, and two rear wheels;
 a pushing frame including two longitudinal arms, each having a forward end and a rearward end, said arms extending substantially parallel to the forward-rearward axis of said chassis;
 a forwardly and upwardly inclined transverse plate extending between the forward ends of said arms and rigidly connected thereto;
 at least two relatively flat plates attached one each to said transverse plate and spaced slightly inwardly from said arms, said plates extending upwardly into attachment with said chassis;
 means attaching the rearward ends of said arms to said chassis;
 a bulldozer blade frame consisting of a substantially U-shaped member having a bight portion and two leg portions, said bight portion being pivotally connected to said forward ends of said arms of said pushing frame with said leg portions extending outwardly and forwardly of said front wheels;
 an upwardly extending elevator arm rigidly attached to said bight portion of said blade frame;
 a bulldozer blade rigidly attached to the forwardmost ends of said leg portions of said blade frame;
 hydraulic means between said pushing frame and said elevator arm to pivot said blade frame and attached blade vertically about the point of connection of of said blade frame to said arms of said pushing frame.

4. The combination of claim 3, wherein said hydraulic means to pivot said blade frame and attached blade consists of an expansible and retractable hydraulic piston-cylinder arrangement pivotably attached at one end to the uppermost end of said elevator arm and pivotally attached at the other end to one of said arms, the point of attachment to said arm being longitudinally variable.

References Cited by the Examiner

UNITED STATES PATENTS

| | | | |
|---|---|---|---|
| 1,694,174 | 12/28 | Greenwood | 37—42 |
| 2,584,485 | 2/52 | McNeel | 37—28 |
| 2,626,470 | 1/53 | Cook | 37—42 X |
| 2,667,708 | 2/54 | Gjesdahl | 37—42 |
| 2,725,650 | 12/55 | Crawford | 37—144 |
| 2,738,083 | 3/56 | Cadwell | 172—273 X |
| 2,972,424 | 2/61 | Cadwell | 172—273 |

FOREIGN PATENTS 221,011  8/57  Australia.

OTHER REFERENCES

Operator's Manual, OM-U11585U, For the John Deere 301, Bulldozer, pamphlet 5–59, published by the John Deere Tractor Co., Moline, Ill., pp. 1 and 4, relied on.

T. GRAHAM CRAVER, *Primary Examiner.*

BENJAMIN HERSH, ABRAHAM G. STONE,
*Examiners.*